United States Patent
Reiners et al.

(10) Patent No.: US 7,255,902 B2
(45) Date of Patent: Aug. 14, 2007

(54) THERMO-FORMABLE MULTILAYER BARRIER FILM WITH THE APPEARANCE AND TEXTURE OF PAPER

(75) Inventors: Ulrich Reiners, Venray (NL); Erik Järund, Fjällbacka (SE); Leif Linné, Rydebäck (SE)

(73) Assignee: Convenience Food Systems B.V., AA Bakel (NL)

( * ) Notice: Subject to any disclaimer, the term of this patent is extended or adjusted under 35 U.S.C. 154(b) by 0 days.

(21) Appl. No.: 09/851,460

(22) Filed: May 8, 2001

(65) Prior Publication Data

US 2001/0033920 A1    Oct. 25, 2001

Related U.S. Application Data

(63) Continuation of application No. 09/591,919, filed on Jun. 9, 2000, now abandoned, which is a continuation of application No. 09/072,018, filed on May 4, 1998, now abandoned, which is a continuation of application No. PCT/EP96/04681, filed on Oct. 28, 1996.

(30) Foreign Application Priority Data

Nov. 4, 1995  (EP) ................................ 95117387

(51) Int. Cl.
  *B32B 1/08*    (2006.01)
  *B32B 27/08*   (2006.01)

(52) U.S. Cl. .................. 428/34.7; 428/36.7; 428/516

(58) Field of Classification Search ............... 428/34.7, 428/35.2, 35.4, 36.4, 36.7, 36.9, 41.3, 41.8, 428/516, 320, 330, 331, 323
See application file for complete search history.

(56) References Cited

U.S. PATENT DOCUMENTS

| | | |
|---|---|---|
| 3,874,984 A | 4/1975 | Newman |
| 4,355,721 A | 10/1982 | Knott, II et al. |
| 4,526,823 A | 7/1985 | Farrell et al. |
| 4,567,089 A | 1/1986 | Hattori et al. |
| 4,578,296 A * | 3/1986 | Miyazaki et al. .......... 428/36.4 |
| 4,626,456 A | 12/1986 | Farrell et al. |
| 4,755,419 A | 7/1988 | Shah |
| 4,764,546 A | 8/1988 | Mitsuno et al. |
| 4,788,105 A | 11/1988 | Mueller et al. |
| 4,842,951 A | 6/1989 | Yamada et al. |
| 4,879,147 A | 11/1989 | Newman et al. |
| 4,919,984 A | 4/1990 | Maruhashi et al. |
| 5,004,647 A | 4/1991 | Shah |
| 5,011,735 A | 4/1991 | Schirmer |
| 5,075,143 A | 12/1991 | Bekele |
| 5,095,063 A | 3/1992 | Okada et al. |
| 5,108,844 A * | 4/1992 | Blemburg et al. .......... 428/518 |
| 5,126,198 A | 6/1992 | Schinkel et al. |
| 5,237,797 A | 8/1993 | Varlet |
| 5,248,534 A | 9/1993 | Rosen |
| 5,345,069 A | 9/1994 | Grindrod |
| 5,374,459 A | 12/1994 | Mumpower et al. |
| 5,449,552 A | 9/1995 | Bochow et al. |
| 5,466,520 A * | 11/1995 | Krallmann et al. ......... 428/323 |
| 5,522,506 A | 6/1996 | Roulin et al. |
| 5,543,223 A | 8/1996 | Shah |
| 5,622,780 A | 4/1997 | Paleari |

FOREIGN PATENT DOCUMENTS

| | | |
|---|---|---|
| DE | 44 10 235 A1 | 9/1995 |
| EP | 0 161 035 A2 | 11/1985 |
| EP | 0 494 594 A1 | 7/1992 |
| EP | 0 613 832 A1 | 9/1994 |

* cited by examiner

*Primary Examiner*—Kevin R. Kruer
(74) *Attorney, Agent, or Firm*—Akin Gump Strauss Hauer & Feld LLP

(57) ABSTRACT

A paper-like multilayer barrier film comprises a filled polypropylene layer and several unfilled layers. The filled layer contains 40-75% by wt. of inorganic fillers, forms one of the two outside layers of the film, and has a thickness of at least 40 μm. The unfilled layers include a barrier layer, a sealing layer, and optionally at least one adhesive layer. The ratio of the total thickness of the unfilled layers to the thickness of the filled layer is in the range of 1:8 to 1:1.2.

19 Claims, No Drawings

THERMO-FORMABLE MULTILAYER BARRIER FILM WITH THE APPEARANCE AND TEXTURE OF PAPER

CROSS-REFERENCE TO RELATED APPLICATIONS

This application is a continuation of U.S. application Ser. No. 09/591,919, filed Jun. 9, 2000, now abandoned, which is a continuation of U.S. application Ser. No. 09/072,018, filed May 4, 1998, now abandoned, which in turn is a continuation of PCT/EP96/04681, filed Oct. 28, 1996.

BACKGROUND OF THE INVENTION

The present invention relates to a multilayer barrier film with very good thermo-forming properties especially on form-, fill- and seal-machines (FFS-machines). The film has paper-like features.

In the food-processing industry perishable products, as for example fresh meat, poultry, fish, cheese and products made from these products, are packed in so-called barrier films. These kinds of food are either packed in a defined gas-atmosphere (MAP-packages=Modified Atmosphere Packages) or in a vacuum (vacuum-packages). Therefore, in MAP-packages the surrounding atmosphere is replaced by various gas mixtures depending on the product. Typical examples for gas compositions are $CO_2/O_2$ mixtures for fresh meat, and gas mixtures of $CO_2$ and $N_2$ for sliced meat. According to that, films with barrier properties must be used as packaging material in relation to the gases mentioned above.

The food products named above as examples can also be vacuum-packed. According to this packaging process the surrounding atmosphere is nearly completely extracted from the packages. Barrier films, which avoid oxygen transfer from the surroundings into the packages, are used as packaging material. A high precentage of MAP- as well as vacuum-packages are produced on FFS-machines. As the geometry of the packages, in dependence on the goods to be packed, is formed by thermo-forming directly before the filling step, this packaging process is characterized by a high flexibility.

There is a variety of films, especially of barrier films, known for packaging. Thus, a transparent film has been known for a long time with the principal structure: polyamide (PA)/ethylene/vinyl alcohol (EVOH)/polyethylene (PE) or polystyrene (PS)/ethylene/vinyl alcohol (EVOH)/polyethylene (PE) or polyester terephthalate (PET)/poly vinylidene chloride (PVDC)/polyethylene (PE).

A non-transparent, white film is also known for packaging purposes. In EP 0161035 a 7-layer film filled with inorganic filler and comprising a barrier layer is described. It has no sealing layer and its thermo-formability is insufficient.

In EP 0494594 (see U.S. Pat. No. 5,248,534) a multilayer barrier film with a filled layer is disclosed which does not need an adhesive layer between the individual layers of the film. Based on the fact that the respective neighboring layers of the film are composed to some extent of the polymer of the neighboring layer, an adhesion between these layers is achieved after extruding, pressing together and cooling of these respective layers of the film.

These kinds of film also show the disadvantage of not being sufficiently thermo-formable.

SUMMARY OF THE INVENTION

Therefore, it is an object of the present invention to provide a multilayer barrier film with a paper-like nature, which is suitable for thermo-forming and sealing especially well on FFS-machines, and thus can easily be processed on FFS-machines to multilayer barrier film packages for perishable food.

This and other objects and advantages are achieved according to the invention by the supply of an asymmetrically composed film, comprising a filled layer based on polypropylene and several unfilled layers characterized in that the filled layer comprises 40-75 weight % of inorganic filler, forms one of the surface layers of the film and has a thickness of at least 40 µm, the unfilled layers comprise at least one barrier layer and one sealing layer and optionally at least one adhesive layer, and the ratio of the sum of the thicknesses of the unfilled layers to the thickness of the filled layer is from 1:8 to 1:1.2.

DETAILED DESCRIPTION OF THE INVENTION

Calcium carbonate, calcium sulfate, talcum powder, kaolin, silicon dioxide and/or titanium dioxide are suitable as inorganic fillers. In a particular embodiment the filled layer contains calcium carbonate or a mixture of calcium carbonate and titanium dioxide. The particle size of the fillers lies between 1 and 10 µm. Particle sizes between 2 and 6 µm are preferred.

The matrix polymer of the filled layer is based on polypropylene. Homopolymer, as well as propylene/ethylene copolymer, or a mixture of both can be used. Preferably polypropylene-homopolymer with a melt index of 0.5 to 7, particularly preferred of 1.5 to 4.5 g/10 mm (2.16 kg, 230° C. measured according to ASTM 1238) is used. In another preferred embodiment a propylene/ethylene copolymer with a melt index between 0.5 and 5 g/10 min (2.16 kg, 230° C., measured according to ASTM 1238) is used.

The amount of fillers in the filled layer amounts to between 40 and 75 weight % based on the weight of the filled layer. Preferably the amount of fillers lies between 45 and 60 weight %.

As an unfilled layer according to the present invention, a layer containing inorganic additives in the usual amount (<2 weight %) is also intended to be included.

The thickness of the filled layer should be at least 40 µm, preferably 40 µm-400 µm. Particularly preferred are thicknesses in the range of 50-250 µm.

The barrier layer should be impermeable, especially with respect to steam, $N_2$, $O_2$ and $CO_2$, as far as possible.

Depending on whether the filled layer and the barrier layer are to be connected by an adhesive or not, the barrier layer comprises either a polymer with good gas-tightness or a mixture of this polymer and the matrix polymer of the filled layer.

If for the adhesion between the filled layer and the barrier layer no adhesive is used, the barrier layer must contain the matrix polymer of the filled layer as one component. The other component in the barrier layer can be polyvinylidene chloride (PVDC), polyamide (PA) or a similar polymer with good gas-tightness, preferably, however, EVOH. The percentage of the gas-tight component in the barrier layer can vary within wide limits. Preferably it should amount to 40-80 weight % based on the total weight of the barrier layer. A barrier layer consisting of 40 weight % of EVOH and 60 weight % of matrix polymer with a melt index of 1.2-8 g/10 min (MFI according to ASTM 1238, 230° C.) has proven to be the most preferable used. Should the filled layer and the barrier layer be connected by means of an adhesive, the barrier layer is preferably composed of a gas-tight polymer, especially preferred being EVOH.

For both applications, the EVOH polymer should contain an ethylene percentage of 32 to 45 mol %. EVOH-copolymers with ethylene percentages of 38 to 45 mol % are preferred. Particularly preferred is an ethylene percentage of 38 mol %. The melt index of the EVOH copolymers should be 1.2-8 g/10 min (MFI according to ASTM 1238, 230° C.). The thickness of the EVOH-layer should be in the range of 3-12 µm, preferably between 5-10 µm.

Ethylene-polymers are used as material for the sealing layer. Here, polyethylene of low density (LDPE), as well as ethylene-vinyl-acetate copolymers (EVA), can be used.

An LDPE with a density in the range of 0.9225 to 0.9335 g/cm$^3$ is preferred. The melt index of the polymers used should be in the range of 0.5 to 8.0 g/10 min (190° C., 2.16 kg, ASTM 1238), preferably between 2 and 5 g/10 min. In a further preferred embodiment an ethylene-vinyl-acetate copolymer with a vinyl-acetate percentage (VAC) of from 3 to 10 weight % is used as a sealing material. Polymers with VAC contents between 4 and 6 weight % are preferred.

According to a special embodiment the sealing layer is peelable. The sealing layer then comprises a mixture of LDPE and polybutylene (PB). PB is mixed with the LDPE in an amount of 15 to 30 weight %, preferably in an amount of 20 to 28 weight % based on the total sealing layer. The melt index of the PB should lie in the range of 0.3 to 2.0 g/10 min (190° C. and 2,16 kg, ASTM 1238). The thickness of the sealing layer should amount to 15-40 µm, preferably 20-30 µm.

When using LDPE as a sealing layer material, an adhesive must be used between the barrier layer and the sealing layer. Should EVA be used as a sealing layer material, an adhesive is advantageous, but not essential. The adhesive preferably comprises acid-modified polyolefins, known in the art.

In a special embodiment the adhesive layers are composed of the usual laminating adhesives, which are applied with a coating quantity between 1.5 and 4 g/m$^2$. The thickness of the adhesive layer can be in the range between 2 and 6 µm. The range between 2 and 4 µm is preferred.

Should the inventive film contain several adhesive layers, they can be made of the same or different materials, preferably, however, of different materials. In the latter case, for example, a laminating adhesive is used between the filled layer of polypropylene and the EVOH-layer, and an acid-modified polyolefin is used as the adhesive between the EVOH-layer and the sealing layer.

It is particularly important for a good thermo-formability and the paper-like appearance of the multilayer barrier film that the relation of the thickness of the unfilled layers to the thickness of the filled layer lie between 1:8 and 1:1.2, especially preferred between 1:4 and 1:2.

The two surface layers of the inventive film can contain the usual lubricating agents and anti-blocking agents, for example erucic acid amide, alkyl polysiloxane, such as polydimethyl siloxane, and silicon dioxide. All or individual layers can contain stabilizers of the known kind as additives.

With the film structure according to the invention a multilayer barrier film is provided, which is not only excellently suitable for thermo-forming, but also shows a paper-like appearance. It has an excellent thermo-formability on FFS-machines and thus can be formed as a packaging material on these machines.

It was surprising to find out that the multilayer barrier films according to the invention can be processed easily on FFS-machines. The thermo-forming of white films filled with inorganic fillers known thus far can only be carried out on other thermo-forming machines with long heating sections. This allowed only the forming, but not the filling or sealing, of the packages on one and the same machine.

A further object of the invention is therefore the use of the multilayer barrier film according to the invention as packaging material formed on FFS-machines for packaging of food, especially for packaging of perishable products such as meat, poultry and sliced meat. Because packaging on FFS-machines is carried out very often discontinuously, the film must show a particularly broad temperature window in which the thermo-forming of the film can occur.

It has also been completely surprising that the asymmetrically composed film according to the invention leads to excellent thermo-formability, especially deep drawing qualities.

The thermo-formed, preferably deep-drawn, trays produced with the film according to the invention are sealed with known lidding films such as multilayered films with a sequence of layers, for example PET/PVDC/adhesive/LDPE or PET/adhesive/PE/adhesive/EVOH/adhesive/PE.

As lidding films, films with the composition PET/SiO$_x$/adhesive(s)/LDPE are particularly suitable. This biaxial oriented polyethylene terephthalate film is coated in a plasma with SiO$_x$ in a vacuum chamber. In a following step of the manufacturing a prefabricated polyethylene film is laminated on this PET film with an adhesive. This film is characterized by a particularly good transparency and a high breaking resistance. The packaging tray sealed with such film shows a particularly good gas barrier property.

It was also quite unobvious for the expert that by using the film structure according to the invention its paper-like character remains uneffected after the forming, filling and sealing step. The film is completely recyclable if no adhesive layer is present.

The multilayer barrier film according to the invention is produced by the usual blown film coextrusion or cast film coextrusion procedure. Preferably, the usual 5-layer blown film coextrusion procedure is applied. It has proven to be advantageous to add the raw material for the filled layer by compounding. The matrix polymer based on polypropylene is melted via melt extrusion. During the extrusion process the inorganic fillers are added, and after that, the polymer and filler are processed to granulate. It could be advantageous to add the polymer in the form of a powder.

The thus produced granulate is fed to the extruder producing the thickest layer in a blown film process. It could be expedient to produce the outer layer as a filled layer during the blown film process.

In a further manufacturing process the film structure according to the invention can be produced by initially producing the filled layer as a mono-film according to the cast or blown film process. After that, this film can be bonded to a barrier film, also produced according to the cast or blowing process by means of adhesive coating or sandwich coating.

To the extent that the film should also be printed on, an activation of the surface of the filled layer via corona or flame pretreatment should be carried out. The film can also be pretreated in the plasma. A fluorine pretreatment is also possible. The lubricating and anti-blocking agents can be fed into the extruder directly or via a master batch.

The relevant properties of the multilayer film according to the invention are tested under practical conditions on a deep-drawing machine manufactured by Tiromat under the mark Powerpak®. The film according to the invention is used as a packaging material to produce a tray. One means of measurement for the quality of the film is the width of the processing window. The processing window is defined by the packaging speed and the thermo-forming temperature. A high packaging speed with a very broad range of thermo-forming temperature is desired. The thermoforming temperature is the regulated temperature of the heating zone of the packaging machine.

The paper-like appearance of the film according to the invention is judged subjectively by judging the appearance and the touch of the film.

The invention will now be illustrated in more detail with reference to the following specific, non-limiting examples.

EXAMPLE 1

A film with five layers is produced according to the blown film coextrusion procedure. The sequence of the layers is: ABCDE.

Layer A consists of: 53 weight % of calcium carbonate with an average particle size of 4.5 μm and 47 weight % of a propylene homopolymer with a melt index of 2.1 g/10 min.

Layer B consists of: 100 weight % of an acid-modified ethylene methacrylate copolymer with a melting point of 82° C. and a melt index of 6.5 g/10 min and functions as an adhesive layer.

Layer C consists of: 100 weight % of an ethylene vinyl alcohol copolymer with an ethylene percentage of 38 mol % and a melt index of 5.5 g/10 min and functions as a barrier layer.

Layer D consists of: 100 weight % of an acid-modified polypropylene with a melt index of 3.5 g/10 min and functions as an adhesive layer.

Layer E consists of: 75 weight % of a polyethylene with a density of 0.9250 g/cm$^3$ and a melt index of 2.5 g/10 min and 25 weight % of a polybutylene with a melt index of 1.8 g/10 min and functions as a sealing layer.

The thicknesses of the layers are:

| | |
|---|---|
| Layer A: | 200 μm |
| Layer B: | 5 μm |
| Layer C: | 10 μm |
| Layer D: | 5 μm |
| Layer E: | 30 μm |

The total thickness of the multilayer film is 250 μm. The relation of the thickness of the unfilled layers to that of the filled layer is 1:4.

EXAMPLE 2

In this example the layers of the multi-layered film are composed as in Example 1. The thickness of each layer is:

| | |
|---|---|
| Layer A: | 61 μm |
| Layer B: | 2 μm |
| Layer C: | 10 μm |
| Layer D: | 2 μm |
| Layer E: | 25 μm |

The total thickness of the multilayer film is 100 μm. The relation of the thickness of the unfilled layers to that of the filled layer is 1:1.56.

COMPARATIVE EXAMPLE 1

The film used has the same composition of the layers as described in Example 1. The thickness of the layers, however, are:

| | |
|---|---|
| Layer A: | 500 μm |
| Layer B: | 5 μm |
| Layer C: | 10 μm |
| Layer D: | 5 μm |
| Layer E: | 30 μm |

The total thickness of the multilayer film is 550 μm. The relation of the thickness of the unfilled layers to that of the filled layer is 1: 10.

COMPARATIVE EXAMPLE 2

The film used has the same composition of layers as in Example 1.

The thicknesses of the layers, however, are as follows:

| | |
|---|---|
| Layer A: | 40 μm |
| Layer B: | 2 μm |
| Layer C: | 10 μm |
| Layer D: | 2 μm |
| Layer E: | 25 μm |

The total thickness of the multilayer film is 79 μm. The relation of the thickness of the unfilled layers to that of the filled layer is 1:1.02.

The melt indices cited in the Examples are to be determined according to ASTM 1238.

TEST RESULTS OF EXAMPLES

| Film according to | Range of thermo-forming (° C.) | Appearance of the Film |
|---|---|---|
| Example 1 | 125 to 145 | paper-like |
| Comparative Example 1 | 152 to 156 | paper-like |
| Example 2 | 115 to 145 | paper-like |
| Comparative Example 2 | 115 to 145 | plastic |

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A multilayer barrier film comprising a filled layer based on polypropylene and a plurality of unfilled layers, wherein the filled layer is filled with 40-75 weight %, based on the total weight of the filled layer, of an inorganic filler, forms one of the two surface layers of the film, and has a thickness of 40 μm to 400 μm, the unfilled layers comprising at least a barrier layer and a sealing layer and optionally at least one adhesive layer, and the ratio of the total thickness of the unfilled layers to the thickness of the filled layer being from 1:8 to 1:1.2, wherein the sealing layer forms the other of the two surface layers of the film and the barrier layer is sandwiched between the filled layer and the sealing layer, and wherein the film is printed and laminated by adhesives after a corona, flame, fluorine or plasma pretreatment.

2. The multilayer barrier film according to claim 1, wherein the filled layer is selected from the group consisting of polypropylene, propylene/ethylene copolymer, and mixtures thereof as a polymer matrix.

3. The multilayer barrier film according to claim 1, wherein the inorganic filler is selected from the group consisting of calcium carbonate, calcium sulfate, talcum powder, titanium dioxide, kaolin and silicon dioxide.

4. The multilayer barrier film according to claim 1, wherein the barrier layer comprises a mixture of a matrix polymer with EVOH or PA and is bonded to the filled layer without any adhesive layer.

5. The multilayer barrier film according to claim 1, wherein the film is in the form of a packaging material formed on a form-, fill- and seal-machine (FFS-machine).

6. A packaging material for perishable kinds of food, especially meat and poultry, comprising a multilayer barrier film according to claim 1 formed on a FFS-machine by thermo-forming.

7. The multilayer barrier film according to claim 1, wherein the relation of the thickness of the unfilled layers to the thickness of the filled layer is between 1:4 and 1:2.

8. The multilayer barrier film according to claim 1, wherein the inorganic filler consists essentially of a single filler.

9. The multilayer barrier film according to claim 8, wherein the single filler is calcium carbonate.

10. The multilayer barrier film according to claim 1, wherein the barrier layer is selected from the group consisting of ethylene vinyl alcohol copolymer (EVOH), polyvinylidene chloride (PVDC), and polyamide (PA) and is bonded to the filled layer via at least one adhesive layer.

11. The multilayer barrier film according to claim 10, wherein the barrier layer comprises EVOH.

12. The multilayer barrier film according to claim 10, wherein the adhesive layers comprise different materials.

13. The multilayer barrier film according to claim 1, wherein the sealing layer comprises an ethylene polymer.

14. The multilayer barrier film according to claim 13, wherein the ethylene polymer comprises polyethylene of low density (LDPE), optionally mixed with polybutylene, and the sealing layer is bonded to the barrier layer via an adhesive layer.

15. The multilayer barrier film according to claim 13, wherein the ethylene polymer comprises ethylene vinyl acetate copolymer, and the sealing layer is bonded to the barrier layer without any adhesive layer.

16. A package comprising a tray-like lower part produced from a multilayer barrier film comprising a filled layer based on polypropylene and a plurality of unfilled layers, wherein the filled layer is filled with 40-75 weight %, based on the total weight of the filled layer, of an inorganic filler, forms one of the two surface layers of the film, and has a thickness of 40 µm to 400 µm, the unfilled layers comprising at least a barrier layer and a sealing layer and optionally at least one adhesive layer, and the ratio of the total thickness of the unfilled layers to the thickness of the filled layer being from 1:8 to 1:1.2, wherein the sealing layer forms the other of the two surface layers of the film and the baffler layer is sandwiched between the filled layer and the sealing, and wherein the tray-like lower part is sealed by a lidding film.

17. The package according to claim 16, wherein the lidding film comprises a multilayer film with the following sequence of layers: polyester terephthalate (PET)/PVDC/adhesive/LDPE or PET/adhesive/polyethylene (PE)/adhesive/EVOH/adhesive/PE.

18. The package according to claim 16, wherein the lidding film comprises the layers PET/SiO$_x$/adhesive/LDPE.

19. The package according to claim 16, wherein the lidding film is sealed to the sealing layer of the multilayer barrier film.

* * * * *